US009888483B2

(12) United States Patent
Du et al.

(10) Patent No.: US 9,888,483 B2
(45) Date of Patent: Feb. 6, 2018

(54) METHOD AND APPARATUS FOR CONVERTING COMMUNICATION MODES

(71) Applicant: Huawei Technologies Co., Ltd., Shenzhen (CN)

(72) Inventors: Yinggang Du, Shenzhen (CN); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 14/795,599

(22) Filed: Jul. 9, 2015

(65) Prior Publication Data

US 2015/0312921 A1 Oct. 29, 2015

Related U.S. Application Data

(63) Continuation of application No. PCT/CN2014/070110, filed on Jan. 3, 2014.

(30) Foreign Application Priority Data

Jan. 10, 2013 (CN) .......................... 2013 1 0008674

(51) Int. Cl.
*H04L 12/28* (2006.01)
*H04W 4/00* (2009.01)
(Continued)

(52) U.S. Cl.
CPC ............. *H04W 72/085* (2013.01); *H04L 5/14* (2013.01); *H04W 24/02* (2013.01); *H04W 48/20* (2013.01);
(Continued)

(58) Field of Classification Search
CPC .............................. H04W 36/30; H04W 36/22
See application file for complete search history.

(56) References Cited

U.S. PATENT DOCUMENTS

| 2002/0051425 A1 | 5/2002 | Larsson |
| 2004/0008647 A1 | 1/2004 | Hunkeler |

(Continued)

FOREIGN PATENT DOCUMENTS

| CN | 1549613 A | 11/2004 |
| CN | 101378376 A | 3/2009 |

(Continued)

OTHER PUBLICATIONS

3$^{rd}$ Generation Partnership Project; Technical Specification Group GSM/EDGE Radio Access Network; Radio Subsystem Link Control (Release 9), 3GPP TS 45.008, V9.4.0, Sep. 2010, 146 pages.

*Primary Examiner* — Melanie Jagannathan
(74) *Attorney, Agent, or Firm* — Brinks Gilson & Lione (57) ABSTRACT

A method and a device for communication mode switching are provided in embodiment of the present disclosure. The method includes: acquiring at least one candidate communication mode for switching according to a preset channel quality condition, where the channel quality condition is met under the candidate communication mode for switching; evaluating each of the at least one candidate communication mode for switching according to a switch criterion and acquiring an evaluation value of each of the at least one candidate communication mode for switching; and ranking the evaluation value of the at least one candidate communication mode for switching in an ascending order or a descending order and switching a communication system from a current communication mode to a candidate communication mode for switching corresponding to an evaluation value ranked as the first.

12 Claims, 2 Drawing Sheets

(51) Int. Cl.
*H04W 72/08* (2009.01)
*H04W 24/02* (2009.01)
*H04L 5/14* (2006.01)
*H04W 52/02* (2009.01)
*H04W 72/00* (2009.01)
*H04W 48/20* (2009.01)
*H04B 1/10* (2006.01)
*H04B 1/403* (2015.01)

(52) U.S. Cl.
CPC ......... *H04W 52/02* (2013.01); *H04W 72/005* (2013.01); *H04B 1/1027* (2013.01); *H04B 1/406* (2013.01); *Y02B 60/50* (2013.01)

(56) References Cited

U.S. PATENT DOCUMENTS

| | | |
|---|---|---|
| 2007/0153747 A1 | 7/2007 | Pan et al. |
| 2007/0270148 A1* | 11/2007 | Yeh ................... H04W 36/30 455/436 |
| 2008/0159203 A1 | 7/2008 | Choi et al. |
| 2009/0060070 A1 | 3/2009 | Hayase et al. |
| 2009/0207760 A1* | 8/2009 | Brunel ................. H04W 48/20 370/280 |
| 2009/0252113 A1* | 10/2009 | Take ..................... H04W 36/30 370/331 |
| 2010/0215026 A1 | 8/2010 | Cheng et al. |
| 2011/0243040 A1 | 10/2011 | Khan et al. |
| 2011/0249596 A1 | 10/2011 | Ross et al. |
| 2012/0134279 A1 | 5/2012 | Tamaki |

FOREIGN PATENT DOCUMENTS

| | | |
|---|---|---|
| CN | 101569112 A | 10/2009 |
| CN | 102196453 A | 9/2011 |
| CN | 102480316 A | 5/2012 |
| EP | 1 954 066 A1 | 8/2008 |
| EP | 2 234 276 A2 | 9/2010 |
| EP | 2 458 921 A1 | 5/2012 |
| JP | 4700065 B2 | 6/2011 |
| KR | 10-2003-0059215 A1 | 7/2003 |
| WO | WO 02/35779 A2 | 5/2002 |

* cited by examiner

METHOD AND APPARATUS FOR CONVERTING COMMUNICATION MODES

CROSS-REFERENCE TO RELATED APPLICATIONS

This application is a continuation of International Application No. PCT/CN2014/070110 filed on Jan. 3, 2014, which claims priority to Chinese Patent Application No. 201310008674.1, filed on Jan. 10, 2013, both of which are hereby incorporated by reference in their entireties.

TECHNICAL FIELD

The present disclosure relates to the field of communication technology, and in particular, to a method for communication mode switching and a device thereof.

BACKGROUND

Presently, a system may detect one or more transmission quality indexes of a channel, such as received signal strength indication (which is referred to as RSSI for short), signal to noise ratio (which is referred to as SNR for short), channel variation or error rate of decoding, and a communication mode of the system is switched upon a detection that at least one transmission quality index is beyond a preset threshold, for improving utilization rate of the spectrum resource. The communication mode may be a full duplex, a time division duplex (which is referred to as TDD for short), a frequency division duplex (which is referred to as FDD for short), or other possible communication modes.

However, in the conventional art, only the transmission quality indexes of the channel are taken into consideration, while the actual requirement of the communication system is not considered. Thus, the resource of the communication system may be wasted when switching the communication mode of the communication system.

SUMMARY

To overcome the technical drawbacks in the conventional art, it is provided a method for communication mode switching and a device thereof in the present disclosure.

In a first aspect of the present disclosure, it is provided a method for communication mode switching, which includes:

acquiring at least one candidate communication mode for switching according to a preset channel quality condition, where the channel quality condition is met under the candidate communication mode for switching;

evaluating each of the at least one candidate communication mode for switching according to a switch criterion and acquiring an evaluation value of each of the at least one candidate communication mode for switching; and ranking the evaluation value of at least one candidate communication mode for switching in an ascending order or a descending order and switching a communication system from a current communication mode to a candidate communication mode for switching corresponding to an evaluation value ranked as the first.

In a first possible implementation of the first aspect, the evaluating each of the at least one candidate communication mode for switching according to a switch criterion and acquiring an evaluation value of each of the at least one candidate communication mode for switching may include:

evaluating each of the at least one candidate communication mode for switching and calculating the evaluation value of each of the at least one candidate communication mode for switching, by using a formula (1):

$$f_i = \sum_{j=1}^{N} w_{ij} u_{ij}, \quad (1)$$

where $f_i$ is the evaluation value of an i-th communication mode, $w_{ij}$ is a weight value for a j-th cost parameter under the i-th communication mode, $u_{ij}$ is the value of the j-th cost parameter under the i-th communication mode, and i, j and N are integers.

In conjunction with the first possible implementation of the first aspect, in a second possible implementation of the first aspect, the value of the cost parameter may include one or any combination of: the value of an energy required for switching, the value of an energy required for a radio frequency processing, the value of an energy consumption of a base band circuit, the value of an energy required for a processing of a receiving terminal, and an extra energy consumption value; or the value of the cost parameter may include a power load and/or a resource load; or the value of the cost parameter may include the value of a first cost parameter and the value of a second cost parameter; where the value of the first cost parameter includes one or any combination of: the value of an energy required for switching, the value of an energy required for a radio frequency processing, the value of an energy consumption of a base band circuit, the value of an energy required for a processing of a receiving terminal, and an extra energy consumption value; and the value of the second cost parameter includes a power load and/or a resource load.

In conjunction with the first possible implementation of the first aspect, in a third possible implementation of the first aspect, the value of the cost parameter may include a spectral efficiency and a system implementation complexity; or the cost parameter may include a throughput and a system implementation complexity; or the cost parameter may include a spectral efficiency, a system implementation complexity and a throughput.

In conjunction with the first possible implementation of the first aspect, in a fourth possible implementation of the first aspect, the value of the cost parameter may include the value of a third cost parameter and the value of a fourth cost parameter, the value of the third cost parameter may include one or any combination of: the value of an energy required for switching, the value of an energy required for a radio frequency processing, the value of an energy consumption of a base band circuit, the value of an energy required for a processing of a receiving terminal, an extra energy consumption value, a power load, and a resource load; and the value of the fourth cost parameter may include one or any combination of: a spectral efficiency, a system implementation complexity, and a throughput.

In a second aspect of the present disclosure, it is provided a device for communication mode switching, which includes:

an acquiring module, configured to acquire at least one candidate communication mode for switching according to a preset channel quality condition, where the channel quality condition is met under the candidate communication mode for switching;

an evaluating module, configured to evaluate each of the at least one candidate communication mode for switching according to a switch criterion and acquire an evaluation value of each of the at least one candidate communication mode for switching; and a switching processing module, configured to rank the evaluation value of the at least one candidate communication mode for switching in an ascending order or a descending order, and switch a communication system from a current communication mode to a candidate communication mode for switching corresponding to an evaluation value ranked as the first.

In a first possible implementation of the second aspect, the evaluating module may be configured to:

evaluate each of the at least one candidate communication mode for switching and calculate the evaluation value of each of the at least one candidate communication mode for switching, by using a formula (1):

$$f_i = \sum_{j=1}^{N} w_{ij} u_{ij}, \qquad (1)$$

where $f_i$ is the evaluation value of an i-th communication mode, $w_{ij}$ is a weight value for a j-th cost parameter under the i-th communication mode, $u_{ij}$ is the value of the j-th cost parameter under the i-th communication mode, and i, j and N are integers.

In conjunction with the first possible implementation of the second aspect, in a second possible implementation of the second aspect, the switching processing module may be configured to: rank the evaluation value of the at least one candidate communication mode for switching in an ascending order, and switch a communication system from a current communication mode to a candidate communication mode for switching corresponding to an evaluation value ranked as the first;

where the value of the cost parameter includes one or any combination of: the value of an energy required for switching, the value of an energy required for a radio frequency processing, the value of an energy consumption of a base band circuit, the value of an energy required for a processing of a receiving terminal, and an extra energy consumption value; or the value of the cost parameter includes a power load and/or a resource load; or the value of the cost parameter includes a the value of a first cost parameter and the value of a second cost parameter; where the value of the first cost parameter includes one or any combination of: the value of an energy required for switching, the value of an energy required for a radio frequency processing, the value of an energy consumption of a base band circuit, the value of an energy required for a processing of a receiving terminal, and an extra energy consumption value; and the value of the second cost parameter includes a power load and/or a resource load.

In conjunction with the first possible implementation of the second aspect, in a third possible implementation of the second aspect, the switching processing module may be configured to: rank the evaluation value of the at least one candidate communication mode for switching in a descending order, and switch a communication system from a current communication mode to a candidate communication mode for switching corresponding to an evaluation value ranked as the first;

where the value of the cost parameter includes a spectral efficiency and a system implementation complexity; or the cost parameter includes a throughput and a system implementation complexity; or the cost parameter includes a spectral efficiency, a system implementation complexity and a throughput.

In conjunction with the first possible implementation of the second aspect, in a fourth possible implementation of the second aspect, the switching processing module may be configured to: rank the evaluation value of the at least one candidate communication mode for switching in an ascending order or a descending order, and switch a communication system from a current communication mode to a candidate communication mode for switching corresponding to an evaluation value ranked as the first;

where the value of the cost parameter includes the value of a third cost parameter and the value of a fourth cost parameter; the value of the third cost parameter includes one or any combination of: the value of an energy required for switching, the value of an energy required for a radio frequency processing, the value of an energy consumption of a base band circuit, the value of an energy required for a processing of a receiving terminal, an extra energy consumption value, a power load, and a resource load; and the value of the fourth cost parameter includes one or any combination of: a spectral efficiency, a system implementation complexity, and a throughput.

With the method for communication mode switching and the device thereof in the embodiments of the present disclosure, the device for communication mode switching acquires at least one candidate communication mode for switching according to the preset channel quality condition, where the channel quality condition is met under the candidate communication mode for switching; the device for communication mode switching evaluates each of the at least one candidate communication mode for switching according to the switch criterion, and acquires the evaluation value of each of the at least one candidate communication mode; the device for communication mode switching rank the evaluation value of the at least one candidate communication mode for switching in an ascending order or a descending order, and switches the communication system from the current communication mode to the candidate communication mode for switching corresponding to an evaluation value ranked as the first. It is ensured that the actual requirement of the communication and/or the user is met every time a switching is performed on the communication system, the resource utilization rate is increased, and the number of switching performed on the communication system is decreased.

BRIEF DESCRIPTION OF THE DRAWINGS

In order to illustrate technical solutions in embodiments of the present disclosure more clearly, drawings to be used for describing the embodiments of the present disclosure are described briefly hereinafter. Apparently, the drawings described hereinafter are only for some embodiments of the present disclosure, and other drawings may be obtained by those ordinary skilled in the art based on those drawings without creative labor.

DETAILED DESCRIPTION

To illustrate the objects, technical solutions and advantages of the present disclosure more clearly, the technical solutions in the embodiments of the present disclosure are described clearly and completely hereinafter in conjunction with the drawings in the embodiments of the present disclosure. Apparently, the described embodiments are only some but not all of the embodiments of the present application. All the other embodiments obtained by those ordinary skilled in the art based on the embodiments of the present disclosure without creative effort fall within the scope of protection of the present disclosure.

The technique described herein is applicable to various communication systems such as the present 2G and 3G communication systems and a next generate communication system, for example, the global system for mobile communications (GSM), the code division multiple access (CDMA) system, the time division multiple access (TDMA) system, the wideband code division multiple access (WCDMA), the frequency division multiple access (FDMA) system, the orthogonal frequency division multiple access (OFDMA) system, the single carrier FDMA (SC-FDMA) system, the general packet radio service (GPRS) system, the long term evolution (LTE) system and other types of communication systems. A method for communication mode switching and the device thereof provided in the present disclosure may be applicable to a user, a network element node device or a base station serving as a sending terminal.

Figure 1:
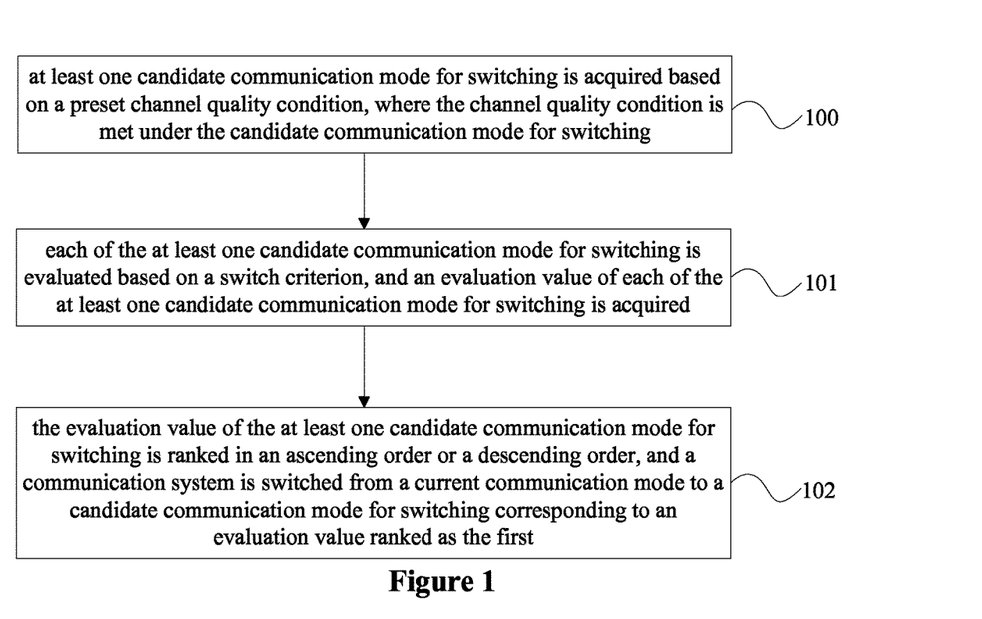
FIG. 1 is a schematic flowchart of a method for communication mode switching according to a first embodiment of the present disclosure.

As shown in FIG. 1, which is a schematic flowchart of a method for communication mode switching according to a first embodiment of the present disclosure, the method includes the following steps.

In step 100, at least one candidate communication mode for switching is acquired according to a preset channel quality condition, where the channel quality condition is met under the candidate communication mode for switching.

Optionally, the preset channel quality condition is used to ensure a lowest requirement on a channel quality required for transmission or to satisfy a communication mode complexity for a most basic transmission. For example, for one candidate communication mode for switching, the lowest requirement may be to satisfy a signal to interference plus noise ratio (which is referred to as SINR for short) corresponding to a lowest-order modulation and coding scheme (which is referred to as MCS for short). When SINR is lower than a preset threshold, it is considered that the communication mode is the candidate communication mode for switching, and signal transmission can not be performed under the candidate communication mode for switching. In the case where the communication mode complexity for the most basic transmission is satisfied, for example, in a place where no roaming service is permitted or the channel condition is relative poor, a transmission without any process such as authentication or charging, i.e., the most basic transmission is performed for an urgent communication. If the preset channel quality condition cannot ensure the most basic transmission, the communication mode complexity for the most basic transmission cannot be satisfied.

For a certain frequency band, all communication modes constitute a set A. The set A may include the full duplex, the time division duplex (which is referred to as TDD for short), the frequency division duplex (which is referred to as FDD) and other possible communication modes. A device for communication mode switching determines, according to the preset channel quality condition, at least one communication mode in the set A as the candidate communication mode for switching, where the channel quality condition is met under the candidate communication mode for switching. That is to say, the device for communication mode switching determines at least one communication mode, under which the lowest requirement on the channel quality required for transmission or the communication mode complexity for the most basic transmission is met, as the candidate communication mode for switching. The device for communication mode switching acquires a set B including all candidate communication modes for switching.

In step 101, each of the at least one candidate communication mode for switching is evaluated according to a switch criterion, and an evaluation value of each of the at least one candidate communication mode for switching is acquired.

Specifically, the device for communication mode switching evaluates, according to the switch criterion, each candidate communication mode for switching in the set B, and acquires the evaluation value of each candidate communication mode for switching. The switch criterion is determined according to different system requirements or user requirements, or different channel conditions, which is not limited here.

In step 102, the evaluation value of the at least one candidate communication mode for switching is ranked in an ascending order or a descending order, and a communication system is switched from a current communication mode to a candidate communication mode for switching corresponding to an evaluation value ranked as the first.

For example, the set B includes the full duplex, the TDD and the FDD. The device for communication mode switching determines, according to the switch criteria, that the evaluation value of the full duplex is 5, the evaluation value of the TDD is 6, and the evaluation value of the FDD is 7. If the energy consumption requirement of the system is taken into consideration mainly, the evaluation values may be ranked in a descending order. Thus, the FDD is the candidate communication mode for switching corresponds to the evaluation value ranked as the first, and the device for communication mode switching switches the system to the FDD for signal transmission.

With the method for communication mode switching in this embodiment, the device for communication mode switching acquires at least one candidate communication mode for switching according to the preset channel quality condition, where the channel quality condition is met under the candidate communication mode for switching; the device for communication mode switching evaluates each of the at least one candidate communication mode for switching according to the switch criterion, and acquires the evaluation value of each of the at least one candidate communication mode; the device for communication mode switching rank the evaluation value of the at least one candidate communication mode for switching in an ascending order or a descending order, and switches the communication system from the current communication mode to the candidate communication mode for switching corresponding to the evaluation value ranked as the first. It is ensured that the actual requirement of the communication and/or the user is met every time a switching is performed on the communication system, the resource utilization rate is increased, and the number of switching performed on the communication system is decreased.

Figure 2:
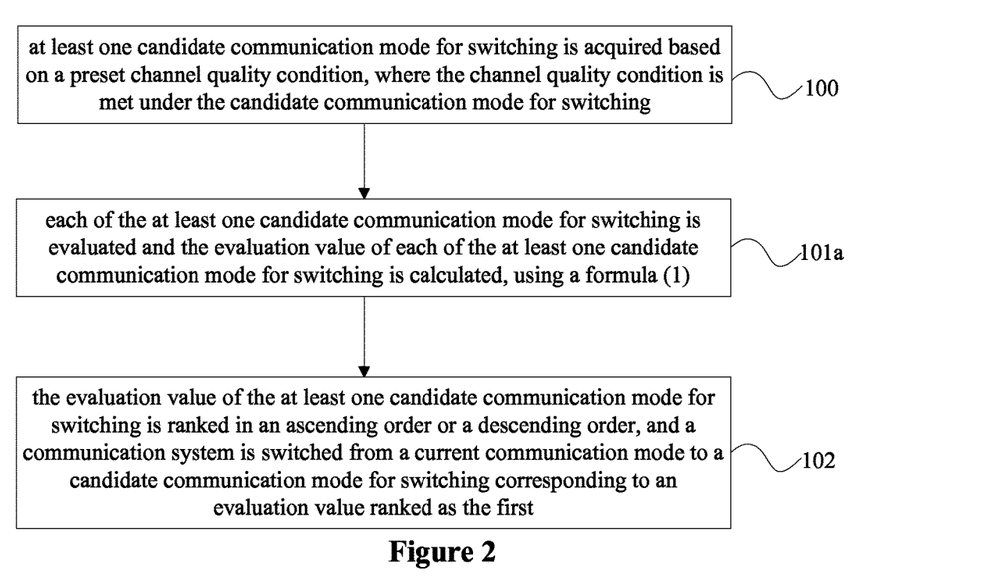
FIG. 2 is a schematic flowchart of a method for communication mode switching according to a second embodiment of the present disclosure.

As shown in FIG. 2, which is schematic flowchart of a method for communication mode switching according to a second embodiment of the present disclosure based on the embodiment shown in FIG. 1, one specific implementation of the step 101 is described as follows.

In step 101a, each of the at least one candidate communication mode for switching is evaluated and the evaluation value of each of the at least one candidate communication mode for switching is calculated, using a formula (1):

$$f_i = \sum_{j=1}^{N} w_{ij} u_{ij}; \tag{1}$$

where $f_i$ is the evaluation value of an i-th candidate communication mode for switching, $w_{ij}$ is a weight value for a j-th cost parameter under an i-th communication mode, $u_{ij}$ is the value of the j-th cost parameter under the i-th communication mode, and i, j and N each are integers.

Specifically, the value $u_{ij}$ the j-th cost parameter under the i-th communication mode may be set depending on different switch criterions. The weight value $w_{ij}$ the j-th cost parameter under the i-th communication mode may be set depending on the influence of the corresponding $u_{ij}$ on the system. For example, if $u_{ij}$ has a more significant influence on the system than a value $u_{ij+1}$ of a (j+1)-th cost parameter under the i-th communication mode, the weight value $w_{ij}$ adjusted to be greater than a weight value $w_{ij+1}$ for $u_{ij+1}$. The specific adjustment is determined based on actual requirement of the system, and is not limited here.

During a communication mode switching of the communication system, the value of the cost parameter and the weight value for the cost parameter in the formula (1) may be determined based on different requirements. The switch criterion provided in the present disclosure is described in the following embodiments.

In a method for communication mode switching according to a third embodiment of the present disclosure based on the above second embodiment, preferably, in the case that the energy consumption requirement of the system is taken into consideration mainly, the value of the cost parameter may include one or any combination of: the value of an energy required for switching, the value of an energy required for a radio frequency processing, the value of an energy consumption of a base band circuit, the value of an energy required for a processing of a receiving terminal, and an extra energy consumption value.

Specifically, $u_{i1}$ may be the value of the energy required for the radio frequency processing. Under the i-th communication mode, the parameters such as a supportable coding and modulating mode, an assigned physical resource, a transmission power parameter and a power amplification coefficient of a transmitter may have influence on the value of the energy required for the radio frequency processing (the value of the energy required for the radio frequency processing is the value of an energy required for signal sending or transmission), accordingly, the value $u_{i1}$ of the energy required for the radio frequency processing needs to be determined based on the above parameters. In a practical transmission, the assigned physical resource may be a time or frequency-domain resource required or assigned under the i-th communication mode, for example, may be a physical resource block (Physical Resource Block, which is referred to as PRB for short) in a long term evolution network (Long Term Evolution, which is referred to as LTE for short). In the case that the energy consumption requirement of the system is taken into consideration mainly, the value of the energy required for the radio frequency processing (i.e., the energy required for signal sending or transmission) is a main influence factor. Correspondingly, in the case that the energy consumption requirement of the system is taken into consideration mainly, the value $u_{i1}$ of the energy required for the radio frequency processing has a more significant influence on the communication system than the value of the energy required for switching, the value of the energy consumption of the base band circuit, the value of the energy required for the processing of the receiving terminal, and the extra energy consumption value. Hence, a weight value $w_{i1}$ for the value $u_{i1}$ of the energy required for the radio frequency processing may be set to be a relative great value (which is greater than each of a weight value for the value of the energy required for switching, a weight value for the value of the energy consumption of the base band circuit, a weight value for the value of the energy required for the processing of the receiving terminal and a weight value for the extra energy consumption value), such as 2.

$u_{i2}$ may be the value of the energy required for switching, which indicates the energy required for a switching between the i-th communication mode required currently and a previous communication mode during signal transmission. If the i-th communication mode is the same as the previous communication mode, $u_{i1}$ is zero. If the i-th communication mode is different from the previous communication mode, $u_{i1}$ is set according to the specific condition of the system. It is to be noted, during switching of the communication mode, the energy required for switching from the i-th communication mode to an (i+1)-th communication mode may be the same as or different from the energy required for switching from the i-th communication mode to an (i−1)-th communication mode, and $u_{i1}$ needs to be set according to the specific condition of the system during the specific switching. Since the value $u_{i2}$ of the energy required for switching has a less significant influence on the communication system than the value of $u_{i1}$ the energy required for the radio frequency processing in the case that the energy consumption requirement of the system is taken into consideration mainly, if the weight value $w_{i1}$ for the value $u_{i1}$ of the energy required for the radio frequency processing is set to be 2, the weight value $w_{i2}$ for the value $u_{i2}$ of the energy required for switching may be set to be 1. It is to be noted, the weight value $w_{i2}$ should be determined after comparisons between the influences of the cost parameters on the system, and is not limited herein.

$u_{i3}$ may be the value of the energy consumption of the base band circuit, which indicates the energy consumed by, for example, the base band circuit for coding or scrambling or modulating, under the i-th communication mode. The value of the energy consumed by a base band processing of a sending terminal is determined based on a coding and modulating mode which is supportable under the i-th communication mode and determined according to the current channel condition. Correspondingly, the value $u_{i3}$ of the energy consumption of the base band circuit has a less significant influence on the communication system than the value $u_{i2}$ of the energy required for the radio frequency processing in the case that the energy consumption requirement of the system is taken into consideration mainly. Thus, if the weight value $w_{i2}$ for the value $u_{i2}$ of the energy required for the radio frequency processing is set to be 2, a weight value $w_{i3}$ for the value $u_{i3}$ of the energy consumption of the base band circuit may be set to be 1.

$u_{i4}$ may be the value of the energy required for the processing of the receiving terminal, which indicates the energy required for processing a received signal by the receiving terminal under the i-th communication mode. In a specific transmission, since the sending terminal and the receiving terminal are notified of a processing capability of the opposite party, the energy required for processing the received signal by the receiving terminal under an adopted coding and modulating mode may be calculated. Correspondingly, a weight value $w_{i4}$ for the value $u_{i4}$ of the energy required for the processing of the receiving terminal may be set to be 0.5. Considering its less significant influence on the switching of the communication mode of the sending terminal, the weight value $w_{i4}$ is set as 0.5, which is relative small, to avoid error.

$u_{i5}$ may be the extra energy consumption value, which indicates the extra energy consumption caused by the difference between the i-th communication mode adopted by a current service to be transmitted and the communication mode adopted by other service that is transmitted at the same time with the current service. It is to be noted, if the communication system needs to perform operations for multiple services and multiple users at the same time, there may occur a case in which some users or services adopt the full duplex communication mode and other users or services adopt the half duplex communication mode. To support different communication modes, the extra energy consumption value $u_{i5}$ needs to be taken into consideration. Furthermore, in the case that one user sends multiple services at the same time, the extra energy consumption value $u_{i5}$ needs to be taken into consideration. The extra energy consumption value $u_{i5}$ is similar to the value $u_{i2}$ of the energy required for switching, except that the extra energy consumption value $u_{i5}$ is taken into consideration for the communication modes of different users. It is to be noted, it is rarely that one user transmits different uplink signals to different base stations at the same time, the extra energy consumption value $u_{i5}$ is taken into consideration mainly for the base station serving as the sending terminal. In the case that the sending terminal sends a signal of one service to one receiving terminal, the extra energy consumption value $u_{i5}$ is 0.

Alternatively, in the case that a condition of a load of the system is taken into consideration mainly, the value of the cost parameter may include a power load and/or a resource load.

Specifically, in the implementation of the system, to prevent frequent communication mode switching, the load under each candidate communication mode for switching may be taken into consideration. Specifically, $u_{i1}$ is the power load, which indicates the power required under the candidate communication mode for switching, and $u_{i2}$ is the resource load, which indicates the resource required for transmitting a specific service under the candidate communication mode for switching.

Alternatively, to switch the communication mode more accurately and increase the resource utilization rate, both the load of the system and the energy consumption requirement of the system are taken into consideration as main factors, and the value of the cost parameter includes the value of a first cost parameter and the value of a second cost parameter. The value of the first cost parameter includes one or any combination of: the value of an energy required for switching, the value of an energy required for a radio frequency processing, the value of an energy consumption of a base band circuit, the value of an energy required for a processing of a receiving terminal, and an extra energy consumption value. The value of the second cost parameter includes a power load and/or a resource load.

For example, in the case that the value $u_{i1}$ of the energy required for the radio frequency processing, the value $u_{i2}$ of the energy required for switching, the value $u_{i3}$ of the energy consumption of the base band circuit and the load each are taken into consideration, the power load may be set to be $u_{i4}$, and the resource load may be set to be $u_{i5}$.

In each of the above three cases, after the cost parameters are determined, the cost parameters of each candidate communication mode for switching are substituted into formula (1) to acquire the corresponding evaluation value $f_i$. The greater the evaluation value the $f_i$, the less the opportunity that a corresponding communication mode is adopted. After the evaluation value $f_i$ of each candidate communication mode for switching is calculated, step 102 is performed by: ranking the evaluation value $f_i$ of the at least one candidate communication mode for switching in an ascending order, and switching the communication system from a current communication mode to a candidate communication mode for switching corresponding to an evaluation value ranked as the first.

In a method for communication mode switching according to a fourth embodiment of the present disclosure based on the above second embodiment, preferably, in the case that the condition of the spectral efficiency of the system is taken into consideration as a main factor, the value of the cost parameter includes a spectral efficiency and a system implementation complexity.

$u_{i1}$ may be the spectral efficiency, which indicates the spectral efficiency under the i-th communication mode. In the case of transmitting data such as voice data, the data amount is small, and little resource should be assigned even if a lowest-order MCS is adopted. In this case, the spectral efficiencies in various communication modes are substantially the same, and the system implementation complexity needs to be taken into consideration as the main factor. $u_{i2}$ is the value of the system implementation complexity, which indicates the complexity of implementing the i-th communication mode and the switching complexity of switching from a previous communication mode to the i-th communication mode. It is to be noted, if the i-th communication mode is the same as a communication mode previous to the i-th communication mode, the value $u_{i2}$ of the system implementation complexity is 0. During the switching of the communication mode, the communication system may be switched to a communication mode, which is simple to implement, by increasing the value $u_{i2}$ of the cost parameter of the system implementation complexity and maintaining other cost parameters unchanged, thereby increasing the efficiency of the communication system and reducing the usage cost of the communication system.

More preferably, in the case that the maximum throughput of the system is taken into consideration as a main factor, the value of the cost parameter includes a throughput and a system implementation complexity.

The throughput is the production of a spectral efficiency and a bandwidth. $u_{i1}$ may be the throughput, which indicates the number of signals that are transmitted successfully per unit time. Similar to the case in which the spectral efficiency of the system is taken into consideration, when transmitting data such as voice data, little resource is allocated even if a most conservative coding and modulating mode is adopted since the amount of data is small. In this case, the throughputs of the various communication modes are substantially the same, and thus the system implementation complexity needs to be further taken into consideration. $u_{i2}$ is the system implementation complexity, which is the same as that in the case where the spectral efficiency of the system is taken into consideration, and is not repeated here.

Alternatively, to switch the communication mode more accurately and increase the resource utilization rate, both the implementation complexity of the system and the maximum throughput of the system are taken into consideration as main factors, and the cost parameter includes the spectral efficiency, the system implementation complexity and the throughput.

For example, $u_{i1}$ is the spectral efficiency, $u_{i2}$ is the system implementation complexity, and $u_{i3}$ may be set as the throughput if the maximum throughput is further taken into consideration.

In each of the above three cases, after values of the second cost parameters are determined, the cost parameters of each candidate communication mode for switching are substituted into formula (1) to acquire a corresponding evaluation value $f_i$. The less the evaluation value $f_i$, the less the opportunity that the corresponding communication mode is adopted. After the evaluation value $f_i$ of each candidate communication mode for switching is calculated, step 102 is performed by: ranking the evaluation value $f_i$ of the at least one candidate communication mode for switching in a descending order, and switching the communication system from a current communication mode to a candidate communication mode for switching corresponding to an evaluation value ranked as the first.

It is to be noted, in the above third and fourth embodiments, in each of the above four cases, the cost parameters of each candidate communication mode for switching are substituted into formula (1) to acquire the corresponding evaluation value $f_i$, the evaluation value $f_i$ of the at least one candidate communication mode for switching is ranked in a descending order or an ascending order, and the communication system is switched from the current communication mode to the candidate communication mode for switching corresponding to the evaluation value ranked as the first. For each switching, the evaluation value $f_i$ is calculated based on different requirements, such as those in the above four cases. Since all the factors having influence on communication mode switching are contained in the switch criterion, it is ensured that each switching meets the requirements of the communication system and/or the user, thereby increasing the resource utilization rate and decreasing the number of switching performed on the communication system.

In the above embodiments, the candidate communication mode for switching is determined in view of the energy consumption requirement and/or the load of the system, and the spectral efficiency of the system and/or the maximum throughput of the system. To switch the communication mode more accurately and increase the resource utilization rate, cost parameters in different embodiments may be taken into consideration collectively. In a method for communication mode switching according to a fifth embodiment of the present disclosure, the value of the cost parameter includes the value of a third cost parameter and the value of a fourth cost parameter. The value of the third cost parameter includes one or any combination of: the value of an energy required for switching, the value of an energy required for a radio frequency processing, the value of an energy consumption of a base band circuit, the value of an energy required for a processing of a receiving terminal, an extra energy consumption value, a power load, and a resource load.

The value of the fourth cost parameter includes one or any combination of: a spectral efficiency, a system implementation complexity, and a throughput.

Specifically, for example, if the candidate communication mode for switching is determined in view of the power consumption requirement of the system, a value $u_{i6}$ of a fourth cost parameter indicating the throughput may be added when considering the maximum throughput, in addition to the value $u_{i1}$ of the energy value required for the radio frequency processing, the value $u_{i2}$ of the energy required for switching, the value $u_{i3}$ of the energy consumption of the base band circuit, the value $u_{i4}$ of the energy required for the processing of the receiving terminal, and the extra energy consumption value $u_{i5}$. It is to be noted, if the candidate communication mode for switching is determined in view of the power consumption requirement of the system, the greater the evaluation value $f_i$, the less the opportunity that a corresponding communication mode is adopted. If the candidate communication mode for switching is determined in view of the maximum throughput of the system, the greater the evaluation value $f_i$, the greater the opportunity that the corresponding communication mode is adopted. To unify the final ranking of the candidate communication modes for switching, a weight value $w_{i6}$ for the added throughput may be set to be a negative value. The evaluation value of each candidate communication mode for switching is acquired based on the above cost parameters and the corresponding weight values. Since the weight value $w_{i6}$ for the cost parameter representing the throughput is set to be a negative value, the evaluation value $f_i$ of the at least one candidate communication mode for switching is ranked in an ascending order, and the communication system is switched from a current communication mode to a candidate communication mode for switching corresponding to an evaluation value ranked as the first. Practically, if the weight values for the value $u_{i1}$ of the energy value required for the radio frequency processing, the value $u_{i2}$ of the energy required for switching, the value $u_{i3}$ of the energy consumption of the base band circuit, the value $u_{i4}$ of the energy required for the processing of the receiving terminal, and the extra energy consumption value $u_{i5}$ each are set to be negative, and the weight value for the added throughput is set to be a positive value, the evaluation value $f_i$ of the at least one candidate communication mode for switching is ranked in a descending order, and the communication system is switched from a current communication mode to a candidate communication mode for switching corresponding to an evaluation value ranked as the first.

For example, if the candidate communication mode for switching is determined in view of the spectral efficiency of the system, two first cost parameters $u_{i3}$ and $u_{i4}$ may be added, in addition to the values of second cost parameters such as the spectral efficiency and the system implementation complexity. $u_{i3}$ may be the power load, and $u_{i4}$ may be the resource load. If the candidate communication mode for switching is determined in view of the spectral efficiency of the system, the weight values for the power load $u_{i3}$ and the resource load $u_{i4}$ may be set to be negative values, and accordingly, the evaluation value $f_i$ of the at least one candidate communication mode for switching is ranked in a descending order, and the communication system is switched from a current communication mode to a candidate communication mode for switching corresponding to an evaluation value ranked as the first.

Whether the above weight values are set to be positive or negative is not limited here, and may be set based on the specific condition of the system, as long as the candidate communication mode for switching which is ranked as the first is the best communication mode for transmitting the service by the system, thereby meeting the actual requirements of the system and/or the user, and achieving the optimal resource utilization rate.

Figure 3:
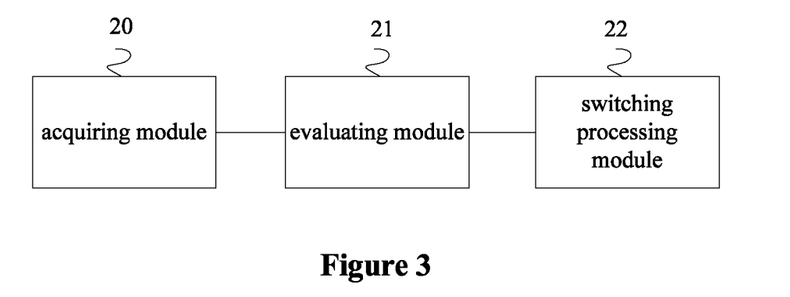
FIG. 3 is a schematic structural diagram of a first example of a device for communication mode switching provided in the present disclosure.

As shown in FIG. 3, which is a schematic structural diagram of a first example of a device for communication mode switching provided in the present disclosure, the device for communication mode switching includes an acquiring module 20, an evaluating module 21 and a switching processing module 22. The acquiring module 20 is used to acquire at least one candidate communication mode for switching according to a preset channel quality condition, where the channel quality condition is met under the candidate communication mode for switching. The evaluating module 21 is used to evaluate each of the at least one candidate communication mode for switching according to a switch criterion and acquire an evaluation value of each of the at least one candidate communication mode for switching. The switching processing module 22 is used to rank the evaluation value of the at least one candidate communication mode for switching in an ascending order or a descending order, and switch a communication system from a current communication mode to a candidate communication mode for switching corresponding to an evaluation value ranked as the first.

The device for communication mode switching in the example may be perform the technical solution in the method embodiment shown in FIG. 1, and the implementation principle is similar to the method, which is not described in detail here.

With the device for communication mode switching in the example of the present disclosure, at least one candidate communication mode for switching is acquired by the acquiring module of the device for communication mode switching according to the preset channel quality condition, where the channel quality condition is met under the candidate communication mode for switching. Each of the at least one candidate communication mode for switching is evaluated by the evaluating module of the device for communication mode switching according to the switch criterion, and the evaluation value of each of the at least one candidate communication mode for switching is acquired. The evaluation value of the at least one candidate communication mode for switching is ranked, by the switching processing module of the device for communication mode switching, in an ascending order or a descending order, and the communication system is switched from a current communication mode to the candidate communication mode for switching corresponding to the evaluation value ranked as the first. It is ensured that the actual requirement of the communication and/or the user is met every time a switching is performed on the communication system, the resource utilization rate is increased, and the number of switching performed on the communication system is decreased.

Further, in a second example of a device for communication mode switching, on the basis of the example shown in FIG. 3, the evaluating module 21 is used to:

evaluate each of the at least one candidate communication mode for switching and calculate the evaluation value of each of the at least one candidate communication mode for switching, using a formula (1):

$$f_i = \sum_{j=1}^{N} w_{ij} u_{ij}, \quad (1)$$

where $f_i$ is the evaluation value of an i-th communication mode, $w_{ij}$ is a weight value for a j-th cost parameter under the i-th communication mode, $u_{ij}$ is the value of the j-th cost parameter under the i-th communication mode, and i, j and N each are integers.

During a communication mode switching of the communication system, the value of the cost parameter and the weight value for the cost parameter in the formula (1) may be determined based on different requirements.

Further, in a third example of a device for communication mode switching, on the basis of the above second example, the switching processing module 22 is used to: rank the evaluation value of the at least one candidate communication mode for switching in an ascending order, and switch a communication system from a current communication mode to a candidate communication mode for switching corresponding to an evaluation value ranked as the first.

The value of the cost parameter may include one or any combination of: the value of an energy required for switching, the value of an energy required for a radio frequency processing, the value of an energy consumption of a base band circuit, the value of an energy required for a processing of a receiving terminal, and an extra energy consumption value.

Alternatively, the value of the cost parameter may include a power load and/or a resource load.

Alternatively, the value of the cost parameter includes the value of a first cost parameter and the value of a second cost parameter. The value of the first cost parameter includes one or any combination of: the value of an energy required for switching, the value of an energy required for a radio frequency processing, the value of an energy consumption of a base band circuit, the value of an energy required for a processing of a receiving terminal, and an extra energy consumption value. The value of the second cost parameter includes a power load and/or a resource load.

In the case that an energy consumption requirement of the system is taken into consideration, the value of the cost parameter may include one or any combination of: the value of an energy required for switching, the value of an energy required for a radio frequency processing, the value of an energy consumption of a base band circuit, the value of an energy required for a processing of a receiving terminal, and an extra energy consumption value. Reference may be made to details of the method for communication mode switching in the third embodiment in the case that the energy consumption requirement of the system is taken into consideration, which is not described in detail here.

In the case that a load of the system is taken into consideration, the value of the cost parameter may include a power load and/or a resource load. Reference may be made to the explanations in the method for communication mode switching in the case that the load of the system is taken into consideration, which is not described in detail here.

Further, in a fourth example of the present disclosure, on the basis of the above second example, the switching processing module 22 is used to: rank the evaluation value of the at least one candidate communication mode for switching in a descending order, and switch a communication system from a current communication mode to a candidate communication mode for switching corresponding to an evaluation value ranked as the first. The value of the cost parameter includes a spectral efficiency and a system implementation complexity.

In the case that the spectral efficiency of the system is taken into consideration, the value of the cost parameter includes a spectral efficiency and a system implementation complexity. Reference may be made to explanations in the method for communication mode switching in the case that the spectral efficiency of the system is taken into consideration, which is not described in detail here.

Alternatively, the value of the cost parameter includes a throughput and a system implementation complexity.

In the case that the maximum throughput of the system is taken into consideration, the cost parameter includes a throughput and/or a system implementation complexity. Reference may be made to explanations in the method for communication mode switching in the case that the maximum throughput of the system is taken into consideration, which is not described in detail here.

Alternatively, the value of the cost parameter includes one or any combination of: a spectral efficiency, a system implementation complexity and a throughput.

That is to say, the maximum throughput of the system is taken as one cost parameter if the maximum throughput of the system is taken into consideration.

Further, to switch the communication mode more accurately and increase the resource utilization rate, cost parameters in different examples may be taken into consideration collectively. The switching processing module 22 is used to: rank the evaluation value of the at least one candidate communication mode for switching in an ascending order or a descending order, and switch a communication system from a current communication mode to a candidate communication mode for switching corresponding to the evaluation value ranked as the first.

The value of the cost parameter includes the value of a third cost parameter and the value of a fourth cost parameter. The value of the third cost parameter includes one or any combination of: the value of an energy required for switching, the value of an energy required for a radio frequency processing, the value of an energy consumption of a base band circuit, the value of an energy required for a processing of a receiving terminal, an extra energy consumption value, a power load, and a resource load.

The value of the fourth cost parameter includes one or any combination of a spectral efficiency, a system implementation complexity, and a throughput.

Reference may be made to the method for communication mode switching according to the fifth embodiment of the present disclosure, which is not defined in detail here.

It is further provided a device for communication mode switching according to an embodiment of the present disclosure. The device for communication mode switching includes a storage storing instructions therein; and a processor which is coupled to the storage and is for performing the instructions stored in the storage. The processor is used to acquire at least one candidate communication mode for switching according to a preset channel quality condition, where the channel quality condition is met under the candidate communication mode for switching; evaluate each of the at least one candidate communication mode for switching according to a switch criterion and acquire an evaluation value of each of the at least one candidate communication mode for switching; and rank the evaluation value of the at least one candidate communication mode for switching in an ascending order or a descending order, and switch a communication system from a current communication mode to a candidate communication mode for switching corresponding to an evaluation value ranked as the first.

In the device for communication mode switching in the embodiment, the technical solution provided in FIG. 1 is applied, for realizing the technical effect of the method for communication mode switching according to the first embodiment, which is not repeated here.

Further, the processor is used to evaluate each of the at least one candidate communication mode for switching and calculate the evaluation value of the at least one candidate communication mode for switching, using a formula (1):

$$f_i = \sum_{j=1}^{N} w_{ij} u_{ij}, \qquad (1)$$

where $f_i$ is the evaluation value of an i-th communication mode, $w_{ij}$ is a weight value for a j-th cost parameter under the i-th communication mode, $u_{ij}$ is the value of the j-th cost parameter under the i-th communication mode, and i, j and N each are integers.

Further, the processor is used to rank the evaluation value of the at least one candidate communication mode for switching in an ascending order, and switch a communication system from a current communication mode to a candidate communication mode for switching which corresponds to an evaluation value ranked as the first.

The value of the cost parameter may include one or any combination of: the value of an energy required for switching, the value of an energy required for a radio frequency processing, the value of an energy consumption of a base band circuit, the value of an energy required for a processing of a receiving terminal, and an extra energy consumption value.

Alternatively, the value of the cost parameter may include a power load and/or a resource load.

Alternatively, the value of the cost parameter includes the value of a first cost parameter and the value of a second cost parameter. The value of the first cost parameter includes one or any combination of: the value of an energy required for switching, the value of an energy required for a radio frequency processing, the value of an energy consumption of a base band circuit, the value of an energy required for a processing of a receiving terminal, and an extra energy consumption value. The value of the second cost parameter includes a power load and/or a resource load.

In the case that an energy consumption requirement of the system is taken into consideration, the value of the cost parameter may include one or any combination of: the value of an energy required for switching, the value of an energy required for a radio frequency processing, the value of an energy consumption of a base band circuit, the value of an energy required for a processing of a receiving terminal, and an extra energy consumption value. Reference may be made to explanations of the method for communication mode switching in the case that the energy consumption requirement of the system is taken into consideration, which is not described in detail here.

In the case that a load of the system is taken into consideration, the value of the cost parameter may include a power load and/or a resource load. Reference may be made to the explanations in the method for communication mode switching in the case that the load of the system is taken into consideration, which is not described in detail here.

Further, the processor is used to rank the evaluation value of the at least one candidate communication mode for switching in a descending order, and switch a communication system from a current communication mode to a candidate communication mode for switching corresponding to an evaluation value ranked as the first;

where the value of the cost parameter includes a spectral efficiency and a system implementation complexity.

Alternatively, the value of the cost parameter includes a throughput and a system implementation complexity.

Alternatively, the value of the cost parameter includes one or any combination of: a spectral efficiency, a system implementation complexity and a throughput.

In the case that the spectral efficiency of the system is taken into consideration, the value of the cost parameter includes a spectral efficiency and a system implementation complexity. Reference may be made to explanations in the method for communication mode switching in the case that the spectral efficiency of the system is taken into consideration, which is not described in detail here.

In the case that the maximum throughput of the system is taken into consideration, the cost parameter includes a throughput and a system implementation complexity. Reference may be made to explanations in the method for communication mode switching in the case that the maximum throughput of the system is taken into consideration, which is not described in detail here.

Further, to switch the communication mode more accurately and increase the resource utilization rate, cost parameters in different embodiments may be taken into consideration collectively. The processor is used to: rank the evaluation value of the at least one candidate communication mode for switching in an ascending order or a descending order, and switch a communication system from a current communication mode to a candidate communication mode for switching corresponding to an evaluation value ranked as the first.

The value of the cost parameter includes the value of a third cost parameter and the value of a fourth cost parameter. The value of the third cost parameter includes one or any combination of: the value of an energy required for switching, the value of an energy required for a radio frequency processing, the value of an energy consumption of a base band circuit, the value of an energy required for a processing of a receiving terminal, an extra energy consumption value, a power load, and a resource load.

The value of the fourth cost parameter includes one or any combination of a spectral efficiency, a system implementation complexity, and a throughput.

It should be understood by those ordinal skilled in the art, related hardware may be instructed, by using a program, to perform some or all of the steps of the methods according to the embodiments described above. The program may be stored in a computer readable storage medium. The program, when being executed, performs the steps of the methods according to the embodiments described above. The storage medium includes various media that can store program code, such as ROM, RAM, magnetic disk or optical disk.

Finally, it is to be noted, the above embodiments are only intended to describe the technical solutions of the present disclosure, but not to limit the scope of the present disclosure. Although the present disclosure is described in detail in conjunction with the above embodiments, it should be understood by those ordinal skilled in the art that modifications can be made to the technical solutions recorded in the above embodiments or equivalent replacements can be made to some or all of the technical features thereof, where modifications and equivalent replacements may not make the corresponding technical solutions deviate from the scope of the technical solutions of the embodiments of the present disclosure.

What is claimed is:

1. A method for communication mode switching, applied to a sending device, comprising:
   determining at least one candidate communication mode for switching from all communication modes of the sending device according to a preset channel quality condition, wherein the channel quality condition is met under the candidate communication mode for switching;
   evaluating each of the at least one candidate communication mode for switching according to a switch criterion and acquiring an evaluation value of each of the at least one candidate communication mode for switching by using a formula (1):

$$f_i = \sum_{j=1}^{N} w_{ij} u_{ij}, \qquad (1)$$

wherein $f_i$ is the evaluation value of an i-th communication mode, $w_{ij}$ is a weight value for a j-th cost parameter under the i-th communication mode, $u_{ij}$ is the value of the j-th cost parameter under the i-th communication mode, and i, j and N are integers; and
   ranking the evaluation value of the at least one candidate communication mode for switching in an ascending order or a descending order and switching a communication system of the sending device from a current communication mode to a candidate communication mode for switching corresponding to an evaluation value ranked as the first.

2. The method according to claim 1, wherein the value of the cost parameter comprises one or any combination of: the value of an energy required for switching, the value of an energy required for a radio frequency processing, the value of an energy consumption of a base band circuit, the value of an energy required for a processing of a receiving terminal, and an extra energy consumption value; or
   the value of the cost parameter comprises at least one of a power load and a resource load; or
   the value of the cost parameter comprises the value of a first cost parameter and the value of a second cost parameter; wherein the value of the first cost parameter comprises one or any combination of: the value of an energy required for switching, the value of an energy required for a radio frequency processing, the value of an energy consumption of a base band circuit, the value of an energy required for a processing of a receiving terminal, and an extra energy consumption value; and the value of the second cost parameter comprises at least one of a power load and a resource load.

3. The method according to claim 1, wherein
   the value of the cost parameter comprises a spectral efficiency and a system implementation complexity; or
   the value of the cost parameter comprises a throughput and a system implementation complexity; or
   the value of the cost parameter comprises a spectral efficiency, a system implementation complexity and a throughput.

4. The method according to claim 1, wherein the value of the cost parameter comprises the value of a third cost parameter and the value of a fourth cost parameter,
   the value of the third cost parameter comprises one or any combination of: the value of an energy required for switching, the value of an energy required for a radio frequency processing, the value of an energy consumption of a base band circuit, the value of an energy required for a processing of a receiving terminal, an extra energy consumption value, a power load, and a resource load, and the value of the fourth cost parameter comprises one or any combination of: a spectral efficiency, a system implementation complexity, and a throughput.

5. The method according to claim 1, wherein the current communication mode and the at least one candidate communication mode for switching each comprises the full duplex, the time division duplex (TDD), the frequency division duplex (FDD) and other possible communication modes.

6. The method according to claim 1, wherein the current communication mode and the at least one candidate communication mode for switching each comprises the full duplex, the TDD, the FDD and other possible communication modes.

7. A device for communication mode switching, applied to a sending device, wherein the device for communication mode switching comprises a processor and a memory for storing instructions, and the processor executes the instructions to determine at least one candidate communication mode for switching from all communication modes of the sending device according to a preset channel quality condition, wherein the channel quality condition is met under the candidate communication mode for switching;

evaluate each of the at least one candidate communication mode for switching according to a switch criterion and acquire an evaluation value of each of the at least one candidate communication mode for switching, by using a formula (1):

$$f_i = \sum_{j=1}^{N} w_{ij} u_{ij}, \tag{1}$$

wherein $f_i$ is the evaluation value of an i-th communication mode, $w_{ij}$ is a weight value for a j-th cost parameter under the i-th communication mode, $u_{ij}$ is the value of the j-th cost parameter under the i-th communication mode, and i, j and N are integers; and rank the evaluation value of the at least one candidate communication mode for switching in an ascending order or a descending order, and switch a communication system of the sending device from a current communication mode to a candidate communication mode for switching corresponding to an evaluation value ranked as the first.

8. The device according to claim 7, wherein the processor executes the instructions to: rank the evaluation value of the at least one candidate communication mode for switching in an ascending order, and switch a communication system from a current communication mode to a candidate communication mode for switching corresponding to an evaluation value ranked as the first;

wherein the value of the cost parameter comprises one or any combination of: the value of an energy required for switching, the value of an energy required for a radio frequency processing, the value of an energy consumption of a base band circuit, the value of an energy required for a processing of a receiving terminal, and an extra energy consumption value; or the value of the cost parameter comprises at least one of a power load and a resource load; or the value of the cost parameter comprises a the value of a first cost parameter and the value of a second cost parameter; wherein the value of the first cost parameter comprises one or any combination of: the value of an energy required for switching, the value of an energy required for a radio frequency processing, the value of an energy consumption of a base band circuit, the value of an energy required for a processing of a receiving terminal, and an extra energy consumption value; and the value of the second cost parameter comprises at least one of a power load and a resource load.

9. The device according to claim 7, wherein the processor executes the instructions to: rank the evaluation value of the at least one candidate communication mode for switching in a descending order, and switch a communication system from a current communication mode to a candidate communication mode for switching corresponding to an evaluation value ranked as the first;

wherein the value of the cost parameter comprises a spectral efficiency and a system implementation complexity; or the value of the cost parameter comprises a throughput and a system implementation complexity; or the value of the cost parameter comprises a spectral efficiency, a system implementation complexity and a throughput.

10. The device according to claim 7, wherein the processor executes the instructions to: rank the evaluation value of the at least one candidate communication mode for switching in an ascending order or a descending order, and switch a communication system from a current communication mode to a candidate communication mode for switching corresponding to an evaluation value ranked as the first;

wherein the value of the cost parameter comprises the value of a third cost parameter and the value of a fourth cost parameter; the value of the third cost parameter comprises one or any combination of: the value of an energy required for switching, the value of an energy required for a radio frequency processing, the value of an energy consumption of a base band circuit, the value of an energy required for a processing of a receiving terminal, an extra energy consumption value, a power load, and a resource load; and the value of the fourth cost parameter comprises one or any combination of: a spectral efficiency, a system implementation complexity, and a throughput.

11. The device according to claim 7, wherein the current communication mode and the at least one candidate communication mode for switching each comprises the full duplex, the time division duplex (TDD), the frequency division duplex (FDD) and other possible communication modes.

12. The device according to claim 7, wherein the current communication mode and the at least one candidate communication mode for switching each comprises the full duplex, the TDD, the FDD and other possible communication modes.

* * * * *